United States Patent
Wang et al.

(10) Patent No.: US 8,964,829 B2
(45) Date of Patent: Feb. 24, 2015

(54) TECHNIQUES TO PERFORM FAST MOTION ESTIMATION

(71) Applicant: Microsoft Corporation, Redmond, WA (US)

(72) Inventors: Ce Wang, Bellevue, WA (US); Walid Ali, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 126 days.

(21) Appl. No.: 13/725,408

(22) Filed: Dec. 21, 2012

(65) Prior Publication Data

US 2013/0107966 A1 May 2, 2013

Related U.S. Application Data

(63) Continuation of application No. 12/241,662, filed on Sep. 30, 2008, now Pat. No. 8,363,727.

(51) Int. Cl.
*H04N 7/12* (2006.01)
*H04N 19/51* (2014.01)
*H04N 19/533* (2014.01)

(52) U.S. Cl.
CPC ... *H04N 19/00696* (2013.01); *H04N 19/00606* (2013.01)
USPC ............ 375/240; 375/240.16; 375/240.1; 375/204.12

(58) Field of Classification Search
CPC .............................. H04N 7/50; H04N 7/26244
USPC ........................................ 375/240.16; 382/232
See application file for complete search history.

(56) References Cited

U.S. PATENT DOCUMENTS

| | | | |
|---|---|---|---|
| 6,269,121 B1 * | 7/2001 | Kwak | 375/240.16 |
| 6,529,613 B1 * | 3/2003 | Astle | 382/103 |
| 6,563,874 B1 | 5/2003 | Lu | |
| 6,611,560 B1 * | 8/2003 | Kresch et al. | 375/240.16 |
| 6,925,123 B2 | 8/2005 | Subramaniyan et al. | |
| 6,973,130 B1 | 12/2005 | Wee et al. | |
| 7,075,989 B2 | 7/2006 | Murakami et al. | |
| 7,260,148 B2 | 8/2007 | Sohm | |
| 7,327,787 B1 | 2/2008 | Chen et al. | |
| 7,362,809 B2 | 4/2008 | Booth et al. | |
| 7,471,724 B2 * | 12/2008 | Lee | 375/240.12 |
| 7,523,234 B2 | 4/2009 | Yin et al. | |

(Continued)

OTHER PUBLICATIONS

Yuang Zhang, Joint Source Channel Rate Distortion Optimization for H.264 Video Coding, Apr. 2007, IEEE, vol. 8, pp. 445-454.*

(Continued)

*Primary Examiner* — Dede Zecher
*Assistant Examiner* — Viral Lakhia
(74) *Attorney, Agent, or Firm* — Andrew Smith; Peter Taylor; Micky Minhas

(57) ABSTRACT

Techniques to perform fast motion estimation are described. An apparatus may comprise a motion estimator operative to receive as input a current frame and a reference frame from a digital video sequence. The motion estimator may generate and output a motion vector. The motion vector may represent a change in position between a current block of the current frame and a matching reference block of the reference frame. The motion estimator may utilize an enhanced block matching technique to perform block matching based on stationary and spatially proximate blocks. Other embodiments are described and claimed.

9 Claims, 6 Drawing Sheets

(56) References Cited

U.S. PATENT DOCUMENTS

| | | |
|---|---|---|
| 7,826,527 B2 | 11/2010 | Wang |
| 7,843,462 B2* | 11/2010 | Poon .......................... 345/582 |
| 7,933,333 B2* | 4/2011 | Huang et al. ............. 375/240.16 |
| 8,045,619 B2 | 10/2011 | Lee et al. |
| 8,090,025 B2 | 1/2012 | Sakazume |
| 8,107,535 B2 | 1/2012 | Woods et al. |
| 8,126,052 B2 | 2/2012 | Suzuki et al. |
| 8,155,195 B2* | 4/2012 | Regunathan et al. .... 375/240.16 |
| 8,160,149 B2* | 4/2012 | Demos ..................... 375/240.16 |
| 8,363,727 B2* | 1/2013 | Wang et al. ............. 375/240.16 |
| 2002/0131500 A1 | 9/2002 | Ghandi et al. |
| 2004/0196909 A1 | 10/2004 | Kwon |
| 2004/0202245 A1 | 10/2004 | Murakami et al. |
| 2005/0100095 A1* | 5/2005 | Itoh et al. ................. 375/240.16 |
| 2005/0180506 A1* | 8/2005 | Wittebrood et al. ..... 375/240.16 |
| 2005/0265454 A1 | 12/2005 | Muthukrishnan et al. |
| 2006/0002471 A1* | 1/2006 | Lippincott et al. ....... 375/240.16 |
| 2006/0002472 A1* | 1/2006 | Mehta et al. ............. 375/240.16 |
| 2006/0133496 A1 | 6/2006 | Tsai |
| 2006/0165175 A1 | 7/2006 | Yin |
| 2006/0280248 A1 | 12/2006 | Kim et al. |
| 2007/0206677 A1 | 9/2007 | Ding et al. |
| 2007/0237232 A1 | 10/2007 | Chang et al. |
| 2008/0198931 A1* | 8/2008 | Chappalli et al. ........ 375/240.16 |
| 2009/0060042 A1* | 3/2009 | Lertrattanapanich et al. ........................ 375/240.16 |
| 2009/0067509 A1* | 3/2009 | Poon ........................ 375/240.26 |
| 2010/0027662 A1* | 2/2010 | Pigeon ..................... 375/240.16 |

OTHER PUBLICATIONS

Tourapis, et al., "Highly Efficient Predictive Zonal Algorithms for Fast Blocking Matching Motion Estimation", IEEE Transactions on Circuits and Systems for Video Technology, vol. 12, Issue 10, Oct. 2002, 14 pages.

Gallant, et al.,"An Efficient Computation-Constrained Block-Based Motion Estimation Algorithm for Low Bit Rate Video Coding", Retrieved at <<http://citeseer.ist.psu.edu/cache/papers/cs/13795/http:zSzzSzspmg.ece.ubc.cazSzpubzSzasilomar.pdf/gallant98efficient.pdf>>, 5 pages.

Ying et al., New Motion Estimation Algorithm Used in H.263, retrieved at <<http://users.ece.utexas.edu/~bevans/couorses/ee381/projects/fall98/chen-lu-wang/report.pdf>>, Dec. 4, 1998, 9 pages.

Kwon Nyeongkyu David, "Half-Pixel Accuracy Fast Search in Video Coding", retrieved at <<http://ieeexplore.ieee.org/ie15/8675/27494/01224643.pdf>>, IEEE, pp. 73-76.

* cited by examiner

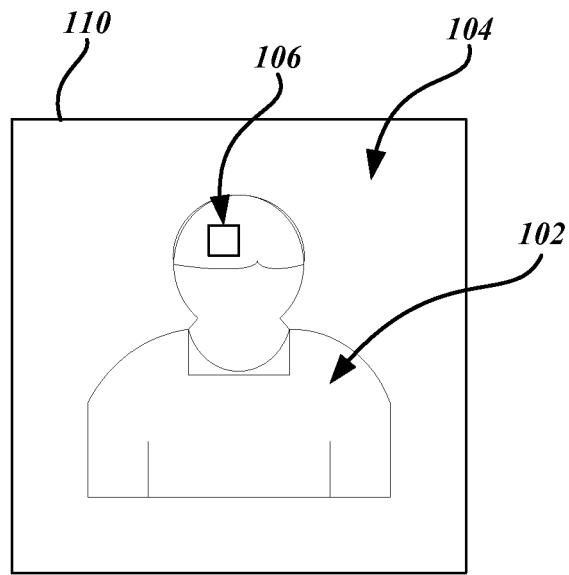
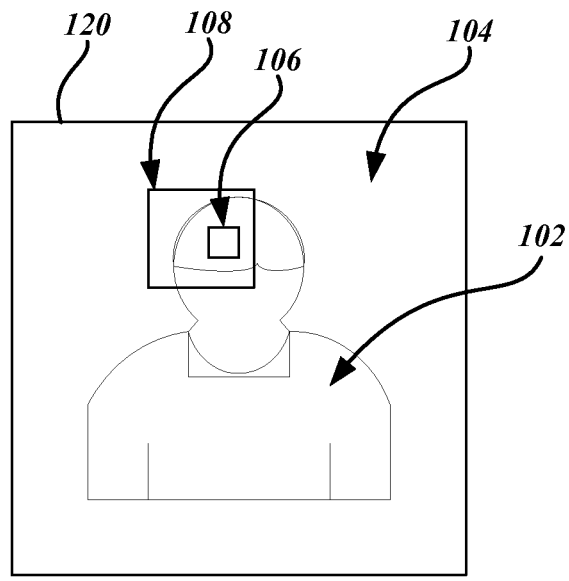
FIG. 1

500

RECEIVE A CURRENT FRAME FROM A DIGITAL VIDEO SEQUENCE
502

RECEIVE A REFERENCE FRAME FROM THE DIGITAL VIDEO SEQUENCE
504

GENERATE A MOTION VECTOR REPRESENTING A CHANGE IN POSITION BETWEEN A CURRENT BLOCK OF THE CURRENT FRAME AND A MATCHING REFERENCE BLOCK OF THE REFERENCE FRAME USING AN ENHANCED BLOCK MATCHING TECHNIQUE ARRANGED TO PERFORM BLOCK MATCHING BASED ON STATIONARY AND SPATIALLY PROXIMATE BLOCKS
506

*FIG. 5*

TECHNIQUES TO PERFORM FAST MOTION ESTIMATION

CROSS-REFERENCE TO RELATED APPLICATIONS

This application is a continuation of, claims the benefit of, and priority to, previously filed U.S. patent application Ser. No. 12/241,662 entitled "TECHNIQUES TO PERFORM FAST MOTION ESTIMATION" filed on Sep. 30, 2008, the subject matter of which is hereby incorporated by reference in its entirety.

BACKGROUND

Motion estimation is an important part of video encoding. It has a direct impact on encoded video quality and bit size. One purpose of motion estimation is to search for the most similar image region in one or more reference pictures, in order to reduce the amount of redundant information in a current picture. Motion estimation, however, is one of the most time consuming parts in the entire video encoding pipeline. In some cases, motion estimation may account for over half of the processing time needed for the total encoding process. A faster motion estimation algorithm would therefore significantly improve encoding and communication performance. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to perform fast motion estimation for a video encoder. Some embodiments are particularly directed to an enhanced block matching technique for motion estimation operations.

In one embodiment, for example, an apparatus may comprise a motion estimator operative to receive as input a current frame and a reference frame from a digital video sequence. The motion estimator may generate and output a motion vector. The motion vector may represent a change in position between a current block of the current frame and a matching reference block of the reference frame. The motion estimator may utilize an enhanced block matching technique to perform block matching based on stationary and spatially proximate blocks. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 1 illustrates an embodiment of frames from a digital video sequence.

FIG. 5 illustrates an embodiment of a first logic flow.

DETAILED DESCRIPTION

Figure 2:
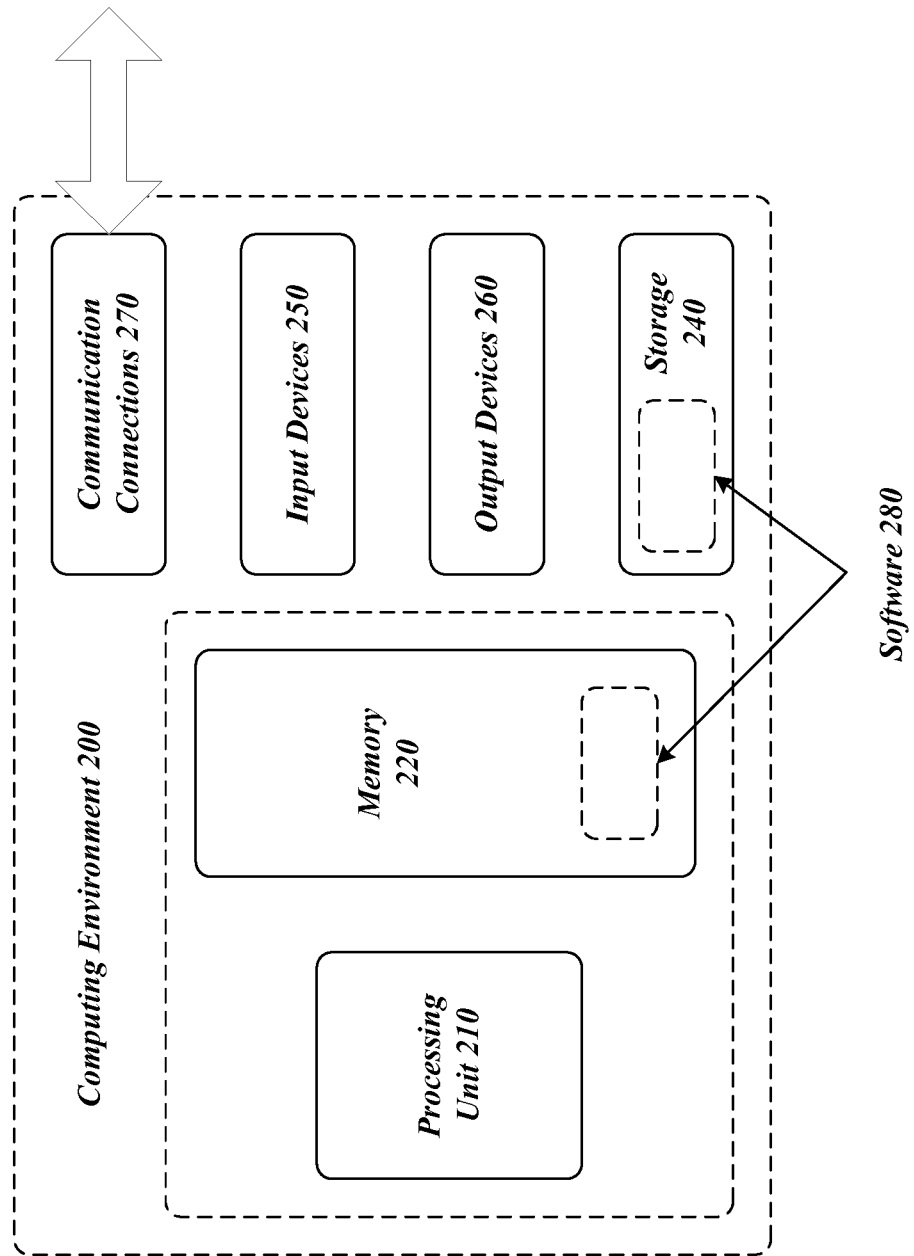
FIG. 2 illustrates an embodiment of an image processing system.

Various embodiments are directed to an enhanced block matching technique suitable for performing fast motion estimation for a video encoder. The enhanced block matching technique is designed based on characteristics of a real time communications environment in order to provide superior block matching performance. As a result, the embodiments can improve affordability, scalability, modularity, extendibility, or interoperability for an operator, device or network.

The enhanced block matching technique utilizes different motion vector predictors and multiple search patterns to accelerate identification of an appropriate matching reference block of a reference frame for a current block of a current frame. For example, the enhanced block matching technique may utilize concepts such as stationary blocks and spatially proximate blocks as search predictors to more quickly locate an appropriate reference block. The enhanced block matching technique may further include spiral search techniques and gradient search techniques in different variations, to provide successive search patterns in those cases where the stationary blocks and spatially proximate blocks do not lead to the appropriate reference block. As a result, the enhanced block matching technique reduces unnecessary search branches and arrives at a target solution at an earlier processing stage. Although performance increases may vary based on a number of factors, in some cases the enhanced block matching technique reduces processing time by a significant amount (e.g., 50%), while still maintaining approximately the same visual quality as more expensive block matching techniques.

FIG. 1 illustrates frames or pictures of a digital video sequence. A video encoder may perform encoding operations on a current frame 110 using a reference frame 120. In the context of a real time communications environment, such as video conferencing, the frames 110, 120 may typically include a limit number of objects, such as an image of a person 102 on a background 104. The video encoder may perform motion estimation to detect motion between objects in the frames 110, 120. For a given block of samples (sometimes referred to as a "macroblock") in the current frame 110, the video encoder finds a similar block of samples in the reference frame 120 for use as a predictive information for encoding operations. The size of the block may vary, but is typically a block of 8×8 or 16×16 samples or some other unit of the current frame 110.

In FIG. 1, a video encoder computes a motion vector for a block 106 in the current frame 110. The encoder searches in a search area 108 of the reference picture 120. Within the search area 108, the video encoder compares the block 106 from the current frame 110 to various candidate reference blocks in order to find a candidate reference block that is a good match. Once a matching reference block is found, the video encoder outputs information specifying a motion vector for the block 106. This continues for all the blocks of the current frame 110, and the motion vectors for the various blocks are sent over a network to a receiving device, where a video decoder reconstructs the current frame 110 using the motion vectors and the reference frame 120.

FIG. 2 illustrates a generalized example of a suitable computing environment 200 in which several of the described embodiments may be implemented. The computing environment 200 is not intended to suggest any limitation as to scope of use or functionality, as the techniques and tools may be implemented in diverse general-purpose or special-purpose computing environments.

With reference to FIG. 2, the computing environment 200 includes at least one processing unit 210 and a memory 220. In FIG. 2, this most basic configuration 230 is included within a dashed line. The processing unit 210 executes computer-executable instructions and may be a real or a virtual processor. In a multi-processing system, multiple processing units execute computer-executable instructions to increase processing power. The memory 220 may be volatile memory (e.g., registers, cache, RAM), non-volatile memory (e.g., ROM, EEPROM, flash memory, etc.), or some combination of the two. The memory 220 stores software 280 implementing an encoder with one or more of the described techniques and tools for motion estimation.

A computing environment may have additional features. For example, the computing environment 200 includes storage 240, one or more input devices 250, one or more output devices 260, and one or more communication connections 270. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, DVDs, or any other medium which can be used to store information and which can be accessed within the computing environment 200. The storage 240 stores instructions for the software 280 implementing the video encoder.

The input devices 250 may include a touch input device such as a keyboard, mouse, pen, or trackball, a voice input device, a scanning device, or another device that provides input to the computing environment 200. For audio or video encoding, the input devices 250 may be a sound card, video card, TV tuner card, or similar device that accepts audio or video input in analog or digital form, or a CD-ROM or CD-RW that reads audio or video samples into the computing environment 200. The output devices 260 may be a display, printer, speaker, CD-writer, or another device that provides output from the computing environment 200.

The communication connections 270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 200, computer-readable media include memory 220, storage 240, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, and other software elements that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine" and "analyze" to describe computer operations in a computing environment. These terms are high-level abstractions for operations performed by a computer, and should not be confused with acts performed by a human being. The actual computer operations corresponding to these terms vary depending on implementation.

In the illustrated embodiment shown in FIG. 2, the computing environment 200 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof.

Generalized Video Encoder

Figure 3:
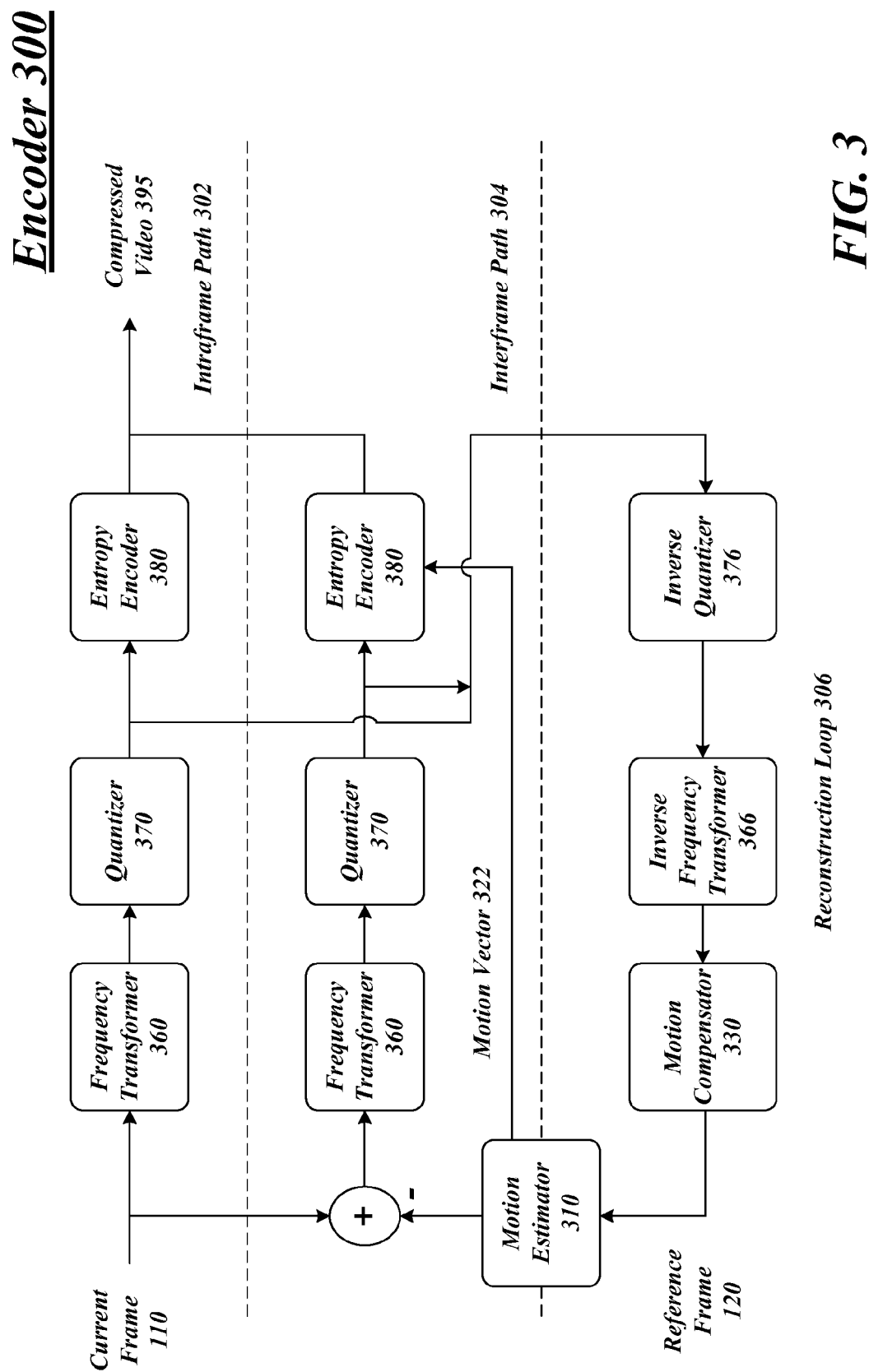
FIG. 3 illustrates an embodiment of a video encoder.

FIG. 3 is a block diagram of a generalized encoder 300 in conjunction with which some described embodiments may be implemented. The encoder 300 receives a sequence of video images including a current frame 110 and produces compressed video information 395 as output to storage, a buffer, or a communications connection. The format of the output bitstream can be a Windows Media Video or VC-1 format, MPEG-x format (e.g., MPEG-1, MPEG-2, or MPEG-4), H.26x format (e.g., H.261, H.262, H.263, or H.264), or other format.

The encoder 300 processes a digital video sequence comprising video frames, images or pictures (these terms are used interchangeably). The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder 300 is block-based and uses a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. The encoder 300 can perform operations on sets of samples of different size or configuration than 8×8 blocks and 16×16 macroblocks. Additionally or alternatively, the encoder is object-based or uses a different macroblock or block format.

Returning to FIG. 3, the encoder 300 compresses predicted pictures and intra-coded, key pictures. For the sake of presentation, FIG. 3 shows an intraframe path 302 for key pictures through the encoder 300, and an interframe path 304 for predicted pictures through the encoder 300. Many components of the encoder 300 are used for compressing both key pictures and predicted pictures. The exact operations performed by those components can vary depending on the type of information being compressed.

A predicted picture is represented in terms of prediction from one or more other pictures, which are typically referred to as reference pictures or anchors. Examples of predicted pictures include without limitation a progressive P-frame or B-frame, interlaced P-field or B-field, interlaced P-frame or B-frame, and so forth. A prediction residual is the difference between predicted information and corresponding original information. In contrast, a key picture is compressed without reference to other pictures. Examples of key pictures include without limitation a progressive I-frame, interlaced I-field, interlaced I-frame, and so forth.

If the current frame 110 is a predicted picture, a motion estimator 310 estimates motion of macroblocks or other sets of samples of the current frame 110 with respect to a reference frame 120. The reference frame 120 may comprise another frame of the digital video sequence. In some cases, the motion estimator 310 may use multiple reference frames. When multiple reference frames are used, the multiple reference frames can be from different temporal directions or the same temporal direction. The encoder 300 can generate the reference frame 120 using a reconstruction loop 306. The reconstruction loop may include an inverse quantizer 376, an inverse frequency transformer 366, and a motion compensator 330. Additionally or alternatively, the encoder 300 can use separate image stores to retrieve the reference frame 120.

The motion estimator 310 can estimate motion by full-sample, ½-sample, ¼-sample, or other increments, and can switch the precision of the motion estimation on a picture-by-picture basis or other basis. The motion estimator 310 (and compensator 330) also can switch between types of reference picture sample interpolation (e.g., between bicubic and bilinear) on a per-picture or other basis. The precision of the motion estimation can be the same or different horizontally and vertically. The motion estimator 310 outputs as side information motion information 315. The encoder 300 encodes the motion information 315 by, for example, computing one or more motion vector predictors for motion vectors, computing differentials between the motion vectors and motion vector predictors, and entropy coding the differentials. To reconstruct a motion vector, a motion compensator 330 combines a motion vector predictor with differential motion vector information.

A frequency transformer 360 converts spatial domain video information into frequency domain (i.e., spectral, transform) data. For block-based video pictures, the frequency transformer 360 applies a discrete cosine transform (DCT), variant of DCT, or other forward block transform to blocks of the samples or prediction residual data, producing blocks of frequency transform coefficients. Alternatively, the frequency transformer 360 applies another conventional frequency transform such as a Fourier transform or uses wavelet or sub-band analysis. The frequency transformer 360 may apply an 8×8, 8×4, 4×8, 4×4 or other size frequency transform.

A quantizer 370 then quantizes the blocks of transform coefficients. The quantizer 370 applies uniform, scalar quantization to the spectral data with a step-size that varies on a picture-by-picture basis or other basis. The quantizer 370 can also apply another type of quantization to spectral data coefficients, for example, a non-uniform, vector, or non-adaptive quantization. In addition to adaptive quantization, the encoder 300 can use frame dropping, adaptive filtering, or other techniques for rate control.

When a reconstructed reference frame 120 is needed for subsequent motion estimation/compensation, an inverse quantizer 376 performs inverse quantization on the quantized spectral data coefficients. An inverse frequency transformer 366 performs an inverse frequency transform, producing reconstructed prediction residuals (e.g., for a predicted picture) or samples (e.g., for a key picture). If the current image 305 was a key picture, the reconstructed key picture is taken as the reconstructed reference frame 120. If the current image 305 was a predicted picture, reconstructed prediction residuals are added to motion-compensated predictors to form the reconstructed reference frame 120. In some embodiments, the encoder 300 applies a de-blocking filter to the reconstructed reference frame 120 to adaptively smooth discontinuities and other artifacts in the reference frame 120.

The entropy coder 380 compresses the output of the quantizer 370 as well as certain side information (e.g., motion information 315, quantization step size, and so forth). Typical entropy coding techniques include arithmetic coding, differential coding, Huffman coding, run length coding, LZ coding, dictionary coding, and combinations of the above. The entropy coder 380 typically uses different coding techniques for different kinds of information, and can choose from among multiple code tables within a particular coding technique. The entropy coder 380 provides compressed video information 395 to a multiplexer (not shown). The multiplexer may include a buffer, and a buffer level indicator may be fed back to a controller. Before or after the multiplexer, the compressed video information 395 can be channel coded for transmission over a network. The channel coding can apply error detection and correction data to the compressed video information 395.

Particular embodiments of video encoders typically use a variation or supplemented version of the generalized encoder 300. Depending on implementation and the type of compression desired, modules of the encoder 300 can be added, omitted, split into multiple modules, combined with other modules, and/or replaced with like modules. In alternative embodiments, encoders with different modules and/or other configurations of modules perform one or more of the described techniques.

Enhanced Block Matching Techniques

In embodiments, the enhanced block matching techniques compare equally sized image data blocks contained within two images captured at different times. The enhanced block matching techniques are directed at generating a motion vector, (MVx, MVy), which estimates the horizontal and vertical displacement of a block from one image to another. The range of a motion vector is constrained by the size of a search window that is employed.

As a general matter, encoders typically spend a large proportion of encoding time performing block matching, attempting to find good matches and thereby improve rate-distortion performance. Using a large search range in a reference picture typically improves the chances of an encoder finding a good match. The encoder potentially compares a current block against all possible spatially displaced blocks in the large search range. In most scenarios, however, an encoder lacks the time or resources to check every possible motion vector in a large search range for every block to be encoded. In particular, when an encoder allows motion vectors for large displacements, the computational cost of searching through a large search range for the best motion vector can be prohibitive, especially when the content to be encoded is high definition video.

The embodiments implement various enhanced block matching techniques to help the motion estimator 310 to speed up motion estimation operations. The enhanced block matching techniques may be described in more detail with reference to FIGS. 4-6.

Figure 4:
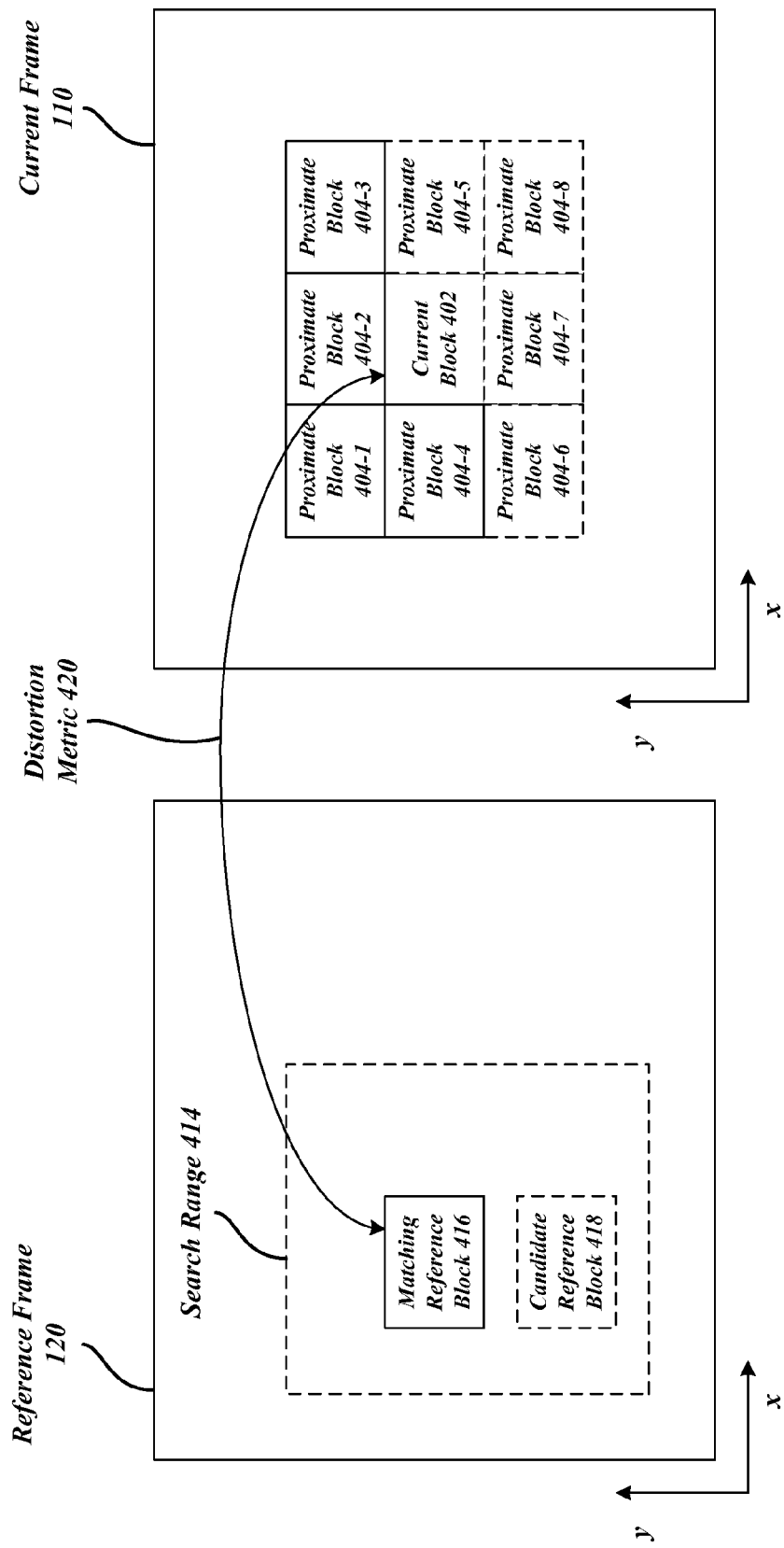
FIG. 4 illustrates an embodiment of frames for a video encoder.

FIG. 4 illustrates a more detailed diagram for the frames 110, 120. The motion estimator 310 may analyze the frames 110, 120 to estimate motion between the frames 110, 120. The motion estimator 310 may perform motion estimation between the frames 110, 120 on a block-by-block basis, comparing each block of the current frame 110 with selected reference blocks from the reference frame 120 to locate a reference block that is a good match for each block of the current frame. For example, a current block 402 may be compared to various candidate reference blocks 418 within a search range 414 to find a matching reference block 416. The current block 402 may represent any given block of the current frame 110 that is subject to analysis by the motion estimator 310 at a given point in time for the motion estimation operations.

In one embodiment, for example, the motion estimator 310 may be arranged to receive as input the current frame 110 and the reference frame 120 from a digital video sequence. The motion estimator 310 may generate a motion vector 322 representing a change in position between a current block 402 of the current frame 110 and a matching reference block 416 of the reference frame 120. The motion estimator 310 may utilize an enhanced block matching technique to perform block matching based on stationary and spatially proximate blocks for one or both of the frames 110, 120.

In one embodiment, the motion estimator 310 may utilize an enhanced block matching technique to perform block matching based on whether the current block 402 comprises a stationary block. In real time communications environments, such as when streaming video content for a video conference, a stationary background is typically a prominent object within the video image. For example, the background 104 of the frames 110, 120 represent a significant amount of area relative to the person 102 as shown in FIG. 1. Therefore, many blocks within the current frame 110 will likely fall within the background 104 of the current frame 110. Those blocks falling within the background 104 would have relatively small motion vector values, and in many cases would be zero. Consequently, the enhanced block matching technique performs comparisons to determine whether the current block 402 is a stationary block, and if so, can quickly exit the enhanced block matching algorithm with the appropriate motion vector for the current block 402. This can be accomplished, for example, by comparing the current block 402 with a candidate reference block from the reference frame 120 having the same spatial position within the reference frame 120 as the current block 402. If there is a good match, then the current block 402 can be considered a stationary block and therefore be assigned a motion vector of zero.

In one embodiment, for example, the motion estimator 310 may select a candidate reference block 418 having a zero motion vector from the reference frame 120 for the enhanced block matching technique. The motion estimator 310 may generate a distortion metric 420 between the candidate reference block 418 and the current block 402, and generate the motion vector 322 having a zero value for the current block 402 when the distortion metric 420 is below a first threshold.

When the motion estimator 310 determines that the current block 402 is not a stationary block, then the enhanced block matching algorithm can move to a next search phase which is based on spatially proximate blocks. Besides the background stationary blocks, the foreground objects usually move in groups as well. Therefore the motion vectors of a region of spatially proximate blocks 404-1-$m$ near the current block 402 can frequently predict a motion vector for the current block 402. The spatially proximate blocks 404-1-$m$ may comprise blocks from the current frame 110 that are in any desired spatial proximity to the current block 402, although a spatially proximate block 404-1-$m$ typically increases in predictive value the closer it is to the current block 402 due to the grouping effect assumed by the enhanced block matching technique. In one embodiment, for example, the spatially proximate blocks 404-1-$m$ may be adjacent to, or adjoining to, the current block 402.

In one embodiment, the motion estimator 310 may determine a spatially proximate motion vector for one or more spatially proximate blocks 404-1-$m$ that are spatially near the current block 402. The motion estimator 310 may select a candidate reference block 418 from the reference frame 120 based on the spatially proximate motion vector. The motion estimator 310 may generate a distortion metric 402 between the candidate reference block 418 and the current block 402. The motion estimator 310 may generate the motion vector 322 for the current block 402 based on the spatially proximate motion vector when the distortion metric 420 is below the first threshold.

The motion estimator 310 may determine a spatially proximate motion vector for one or more spatially proximate blocks 404-1-$m$ that are spatially near the current block 402. The spatially proximate motion vector may comprise a motion vector for one or more of the spatially proximate blocks 404-1-$m$. For example, the motion estimator 310 may determine the spatially proximate motion vector by computing a median value for spatially proximate blocks 404-1-$m$ that already have a motion vector generated for them by the motion estimator 310. When using a raster scan algorithm, for example, the motion estimator 310 may process and analyze blocks from the current frame 110 starting from a top left hand corner and moving to the bottom right hand corner in a row-by-row manner. Consequently, when the motion estimator 310 is processing the current block 402, the spatially proximate blocks 404-1 to 404-4 have already been processed and assigned a motion vector. The motion estimator 310 may calculate a median value for the spatially proximate blocks 404-1 to 404-4, and use the median value to establish the search range 414 for the candidate reference blocks 418.

Additionally or alternatively, the motion estimator 310 may use all of the spatially proximate blocks 404-1 to 404-8 in a region that surrounds the current block 402. When a motion vector has not been generated for a spatially proximate block 404-1-$m$, then a motion vector from a previous frame (e.g., the reference frame 120) for a reference block corresponding to a spatial position for the spatially proximate block 404-1-$m$ may be used.

If the motion estimator 310 still has not found the matching reference block 416 for the current block 402 after using the stationary and spatially proximate blocks, then the motion estimator 310 takes the motion vector with the minimum distortion metric from the previous searches as a seed for subsequent search techniques.

In one embodiment, the motion estimator 310 may determine a minimum distortion metric from the block matching performed based on stationary and spatially proximate blocks when the matching reference block is not found, and selects a subsequent search pattern for the enhanced block matching technique based on the minimum distortion metric. The selection may be performed by comparing the minimum distortion metric to one or more threshold values. For example, the motion estimator 310 may select a first gradient search pattern when the minimum distortion metric is less than or equal to a second threshold value, a second gradient search pattern when the minimum distortion metric is less than or equal to a third threshold value, and a spiral search pattern when the minimum distortion metric is greater than the third threshold value.

The motion estimator 310 may select a spiral search pattern when the minimum distortion metric is greater than the third threshold value. The spiral search pattern starts from a center block and takes a step size of 4 pixels horizontally and vertically. The search range 414 for the spiral search pattern depends in part on a level of diversity between motion vectors for the spatially proximate blocks 404-1-$m$, and may vary for each current block 402. The spiral search pattern may start with a relatively large number, but shrinks relatively fast. If the matching reference block 416 is not found after the motion estimator 310 uses the spiral search patent, then the minimum distortion metric obtained in the process will be used to determine the subsequent search pattern, as well as provide a seed value for the subsequent search pattern.

The motion estimator 310 may select a second gradient search pattern when the minimum distortion metric from the spiral search pattern is less than or equal to the third threshold value. Starting from a center block, the second gradient search pattern checks the left, top, right and bottom points with 2 pixels as a distance. If the matching reference block 416 is not found after the motion estimator 310 uses the second gradient search pattern, the second gradient search pattern starts over from the minimum distortion metric from those just checked. If no smaller point is found, then the minimum distortion metric obtained in the process will be used to determine the subsequent search pattern, as well as provide a seed value for the subsequent search pattern.

The motion estimator 310 may select a first gradient search pattern when the minimum distortion metric is less than or equal to the second threshold value. The first gradient search pattern is performed similar to the second gradient search pattern, with the exception that the search distance is 1 pixel to the center point. When the first gradient search pattern is completed, the full integer pixel motion estimation search is finished. Both the first and second gradient search patterns may have a fixed maximum search length to terminate the search patterns if they cannot otherwise terminate.

Additionally or alternatively, the motion estimator 310 may perform a sub-pixel search pattern. Distortion metrics for the sub-pixels are estimated by interpolation from surrounding integer pixel distortion metrics without full calculation of pixel interpolation and block distortion metrics. This would increase search times as well.

Distortion Metrics

The enhanced block matching techniques may utilize various types of distortion metrics to compare blocks during motion estimation. A distortion metric helps an encoder evaluate the quality and rate costs associated with using a candidate reference block in a motion estimation choice.

The enhanced block matching techniques may use a sum of absolute differences (SAD) distortion metric. To compute the SAD for a candidate reference block in a reference picture, the encoder 300 computes the sum of the absolute values of the residual between the current and candidate reference blocks, where the residual is the sample-by-sample difference between the current block and the candidate reference block. Low computational complexity is an advantage of SAD.

The enhanced block matching techniques may also use a sum of absolute Hadamard-transformed differences (SAHD) distortion metric. To compute the SAHD for a candidate reference block in a reference picture, the encoder 300 Hadamard transforms the current block and Hadamard transforms the candidate reference block, then computes the sum of the absolute values of the differences between the Hadamard-transformed blocks. Alternatively, the encoder 300 computes a residual, Hadamard transforms the residual, and computes the sum of absolute values of the Hadamard-transformed residual. The frequency transform used later in compression is often not a Hadamard transform. Rather, the Hadamard transform approximates the energy compaction of the frequency transform that the encoder 300 later uses on residuals, but the Hadamard transform is simpler to compute. Using SAHD in motion estimation often results in better rate-distortion performance than using SAD, as SAHD accounts for uniform overall sample value shifts, but using SAHD also increases computational complexity.

The enhanced block matching techniques may further use a sum of squared errors (SSE), mean squared error ("MSE"), and mean variance distortion metrics. With SSE, the encoder 300 squares the values of a residual then sums the squared values. With MSE, the encoder 300 computes the mean of the squared values. Mean variance to some extent accounts for overall differences between a current block and candidate reference block. Distortion metrics generated using the SSE, MSE and mean variance techniques yield acceptable rate-distortion performance in some cases, but generally increase the computational complexity of measuring distortion.

The enhanced block matching technique may further use rate-distortion cost as a distortion metric during motion estimation. A rate-distortion cost has a distortion term and a rate term, with a factor (often called a Lagrangian multiplier) scaling the rate term relative to the distortion term. The rate term can be an estimated or actual bit rate cost for motion vector information and/or residual information. The distortion term can be based upon a comparison (e.g., SAD) of original samples to reconstructed samples (e.g., samples reconstructed following a frequency transform, quantization, inverse quantization, and an inverse frequency transform). Alternatively, the distortion term can be some other distortion measure or estimate. Rate-distortion cost usually provides the most accurate assessment of rate-distortion performance of different motion estimation choices, but also has the highest computational complexity, especially if different quantization parameters are evaluated for each different motion estimation choice.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may receive a current frame from a digital video sequence at block 502. For example, the motion estimator 310 of the encoder 300 may receive the current frame 110 from a digital video sequence. The digital video sequence may be received from any type of media source, such as in real-time from an image capture device or a video file stored by various types of storage media. The image capture device may comprise a handheld apparatus or an embedded system. Examples of such devices include mobile wireless phones, Voice over IP (VoIP) phones, personal computers (PCs), personal digital assistants (PDAs), digital cameras, and other consumer electronics. In addition, this system may also be implemented in land line based video phones employing standard public switched telephone network (PSTN) phone lines, integrated digital services network (ISDN) phone lines, and/or packet networks (e.g., local area networks (LANs), the Internet, etc.).

The logic flow 500 may receive a reference frame from the digital video sequence at block 504. For example, the motion estimator 310 of the encoder 300 may receive the reference frame 120 from the digital video sequence. The reference frame 120 may be a reconstructed frame that is reconstructed by the reconstruction loop 306, or a previous frame stored by various types of storage media accessible to the motion estimator 310 (e.g., an image buffer).

The logic flow 500 may generate a motion vector representing a change in position between a current block of the current frame and a matching reference block of the reference frame using an enhanced block matching technique arranged to perform block matching based on stationary and spatially proximate blocks at block 506. For example, the motion estimator 310 of the encoder 300 may generate the motion vector 322 representing a change in position between the current block 402 of the current frame 110 and a matching reference block 416 of the reference frame 120 using an enhanced block matching technique arranged to perform block matching based on stationary and spatially proximate blocks 404-1-$m$. To the extent the stationary block technique and spatially proximate block technique does not yield the matching reference block 416, the motion estimator may employ various subsequent search techniques, such as a spiral search and various gradient searches. The subsequent search techniques may be triggered using distortion metrics generated by the previous search techniques in comparison to one or more threshold values.

Figure 6:
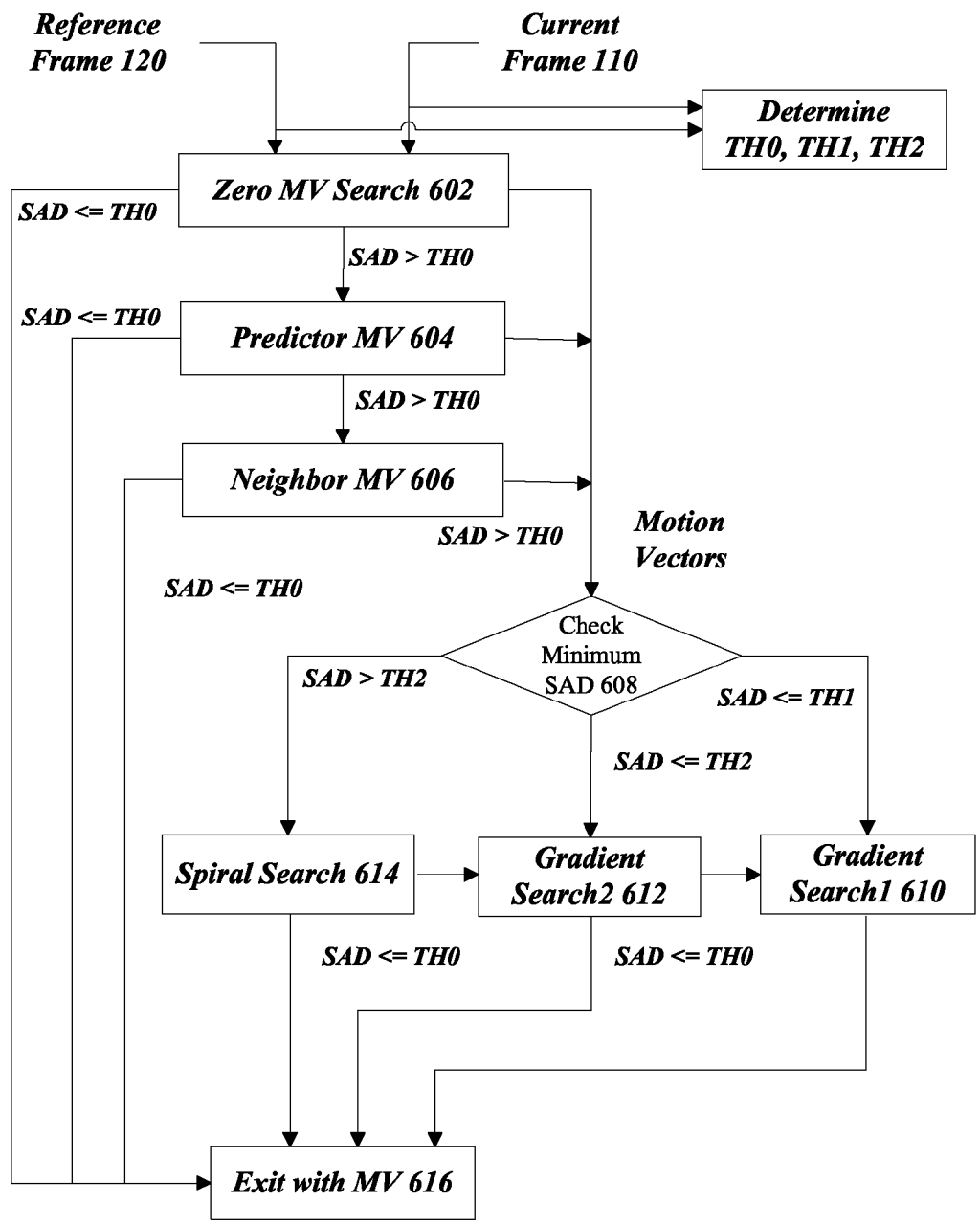
FIG. 6 illustrates an embodiment of a second logic flow.

FIG. 6 illustrates one embodiment of a logic flow 600. The logic flow 600 may be representative of some or all of the operations executed by one or more embodiments described herein. More particularly, the logic flow 600 may represent a more detailed implementation of the operations described with reference to the logic flow 500.

In the illustrated embodiment shown in FIG. 6, the logic flow 600 may receive the frames 110, 120 from a digital video sequence at block 602, and a zero motion vector search may be performed. A comparison is made between the current block 402 and a candidate reference block 418 to generate the distortion metric 420. In one embodiment, the distortion metric may comprise a SAD value due to its efficient computation. If the SAD is below or equal to a first threshold value (TH0), then the candidate reference block 418 comprises the matching reference block 416, and the enhanced block matching algorithm exits with the appropriate motion vector at block 616.

If the minimum SAD from the zero motion vector search is greater than TH0, then the logic flow 600 begins executing a predictor motion vector search using one or more of the spatially proximate blocks 404-1-$m$ having a previously determined motion vector. A median value for the spatially proximate blocks 404-1-$m$ may be used to dynamically adjust the search range 414. A comparison is made between the current block 402 and various candidate reference blocks 418 within the search range 414. If any of the candidate reference blocks 418 have a SAD that is below or equal to TH0, then the candidate reference block 418 comprises the matching reference block 416, and the enhanced block matching algorithm exits with the appropriate motion vector at block 616.

If the minimum SAD from the predictor motion vector search is greater than TH0, then the logic flow 600 begins executing a neighbor motion vector search using one or more of the spatially proximate blocks 404-1-$m$, with some of the spatially proximate blocks 404-1-$m$ having a motion vector retrieved from a corresponding reference block from the reference frame 120. If any of the candidate reference blocks 418 have a SAD that is below or equal to TH0, then the candidate reference block 418 comprises the matching reference block 416, and the enhanced block matching algorithm exits with the appropriate motion vector at block 616.

If the minimum SAD from the neighbor motion vector search is greater than TH0, then the logic flow 600 compares the minimum SAD against a second threshold value (TH1) or a third threshold value (TH2) to select a subsequent search pattern for the enhanced block matching technique at block 608. If the minimum SAD from the neighbor motion vector search is greater than TH2, then a spiral search is performed at block 614. If the minimum SAD from the neighbor motion vector search is less than or equal to TH2, then a second gradient search is performed at block 612. If the minimum SAD from the neighbor motion vector search is less than or equal to TH1, then a first gradient search is performed at block 610.

Assuming the minimum SAD from the neighbor motion vector search is greater than TH2 at block 608, then the spiral search is performed at block 614. After performing the spiral search at block 614, if any of the candidate reference blocks 418 have a SAD that is below or equal to TH0, then the candidate reference block 418 comprises the matching reference block 416, and the enhanced block matching algorithm exits with the appropriate motion vector at block 616. Otherwise, processing passes to the second gradient search at block 612.

Assuming the minimum SAD from the neighbor motion vector search is less than or equal to TH2 at block 608, or the spiral search at block 614 terminates without finding the matching reference block 416, then the second gradient search is performed at block 612. After performing the second gradient search at block 612, if any of the candidate reference blocks 418 have a SAD that is below or equal to TH0, then the candidate reference block 418 comprises the matching reference block 416, and the enhanced block matching algorithm exits with the appropriate motion vector at block 616. Otherwise, processing passes to the first gradient search at block 610.

Assuming the minimum SAD from the neighbor motion vector search is less than or equal to TH1 at block 608, or the second gradient search at block 612 terminates without finding the matching reference block 416, then the first gradient search is performed at block 610. After performing the first gradient search at block 610, if any of the candidate reference blocks 418 have a SAD that is below or equal to TH0, then the candidate reference block 418 comprises the matching reference block 416, and the enhanced block matching algorithm exits with the appropriate motion vector at block 616. Otherwise, the candidate reference block 418 with the smallest SAD is selected as the matching reference block 416, and the enhanced block matching algorithm exits with the appropriate motion vector at block 616.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
receiving a current frame from a digital video sequence;
receiving a reference frame from the digital video sequence;
selecting a candidate reference block having a zero motion vector from the reference frame for a block matching technique;
determining a minimum distortion metric value based on one or more blocks of the current frame and the reference frame;
executing a predictor motion vector search using a spatially proximate block having a previously determined motion vector, when the minimum distortion metric value is above a first threshold value;
executing a neighbor motion vector search when a minimum distortion metric value from the predictor motion vector search is above the first threshold value;
comparing the minimum distortion metric value from the predictor motion vector search to a second threshold value when a minimum distortion metric value from the neighbor motion vector search is above the first threshold value; and
selecting a spiral search pattern for block matching when the minimum distortion metric value from the neighbor motion vector search is above the second threshold; and
generating a motion vector representing a change in position between a current block of the current frame and a matching reference block of the reference frame using an enhanced block matching technique arranged to perform block matching based on stationary and spatially proximate blocks, the block matching technique using the spiral search pattern.

2. The computer-implemented method of claim 1 wherein the digital video sequence is received in real time from a handheld apparatus.

3. The computer-implemented method of claim 1 wherein the reference frame is a previous frame stored in an image buffer.

4. An apparatus, comprising:
a motion estimator operative to receive as input a current frame and a reference frame from a digital video sequence,
select a candidate reference block having a zero motion vector from the reference frame for a block matching technique,
determine a minimum distortion metric value based on one or more blocks of the current frame and the reference frame,
execute a predictor motion vector search using a spatially proximate block having a previously determined motion vector, when the minimum distortion metric value is above a first threshold value,
execute a neighbor motion vector search when a minimum distortion metric value from the predictor motion vector search is above the first threshold value,
compare the minimum distortion metric value from the predictor motion vector search to a second threshold value when a minimum distortion metric value from the neighbor motion vector search is above the first threshold value,
select a spiral search pattern for block matching when the minimum distortion metric value from the neighbor motion vector search is above the second threshold,
and generate a motion vector representing a change in position between a current block of the current frame and a matching reference block of the reference frame, the motion estimator to utilize an enhanced block matching technique to perform block matching based on stationary and spatially proximate blocks, the block matching technique using the spiral search pattern.

5. The apparatus of claim 4 wherein the digital video sequence is received in real time from a handheld apparatus.

6. The apparatus of claim 4 wherein the reference frame is a previous frame in the digital video sequence, the reference frame stored in an image buffer.

7. An article comprising a storage device containing instructions that if executed enable a system to:
receive a current frame and a reference frame from a digital video sequence;
select a candidate reference block having a zero motion vector from the reference frame for a block matching technique;
determine a minimum distortion metric value based on one or more blocks of the current frame and the reference frame;
execute a predictor motion vector search using a spatially proximate block having a previously determined motion vector, when the minimum distortion metric value is above a first threshold value;
execute a neighbor motion vector search when a minimum distortion metric value from the predictor motion vector search is above the first threshold value;
compare the minimum distortion metric value from the predictor motion vector search to a second threshold value when a minimum distortion metric value from the neighbor motion vector search is above the first threshold value;
select a spiral search pattern for block matching when the minimum distortion metric value from the neighbor motion vector search is above the second threshold; and
generate motion vectors representing changes in position between current blocks of the current frame and matching reference blocks of the reference frame using an enhanced block matching technique arranged to perform block matching based on stationary and spatially proximate blocks, the block matching technique using the spiral search pattern.

8. The article of claim 7 wherein the digital video sequence is received in real time from a handheld apparatus.

9. The article of claim 7 wherein the reference frame is a previous frame in the digital video sequence, the reference frame stored in an image buffer.

* * * * *